Dec. 23, 1947.  B. A. SWENNES  2,433,003
SEMI-AUTOMATIC TRANSMISSION
Filed Nov. 15, 1940  2 Sheets-Sheet 2
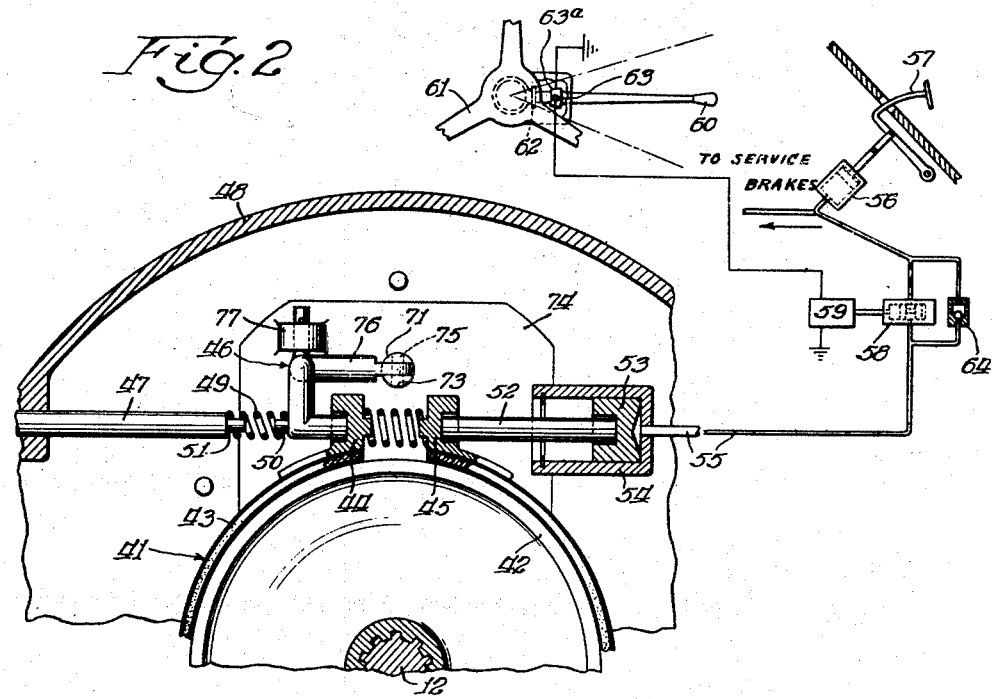
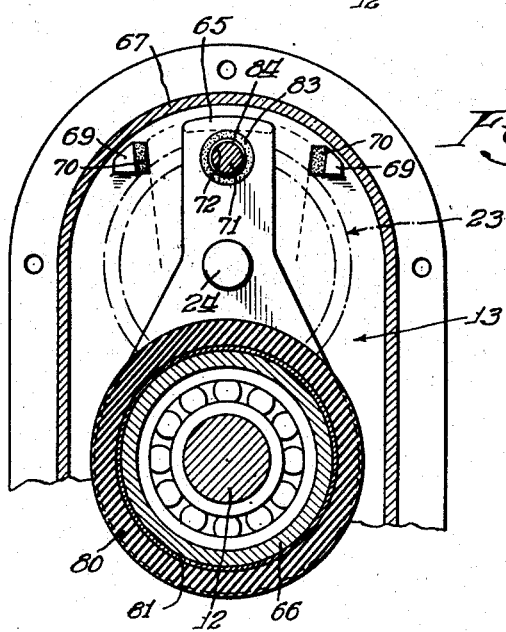
Inventor:
Benjamin A. Swennes
By: Edward C. Gritzbaugh
Atty.

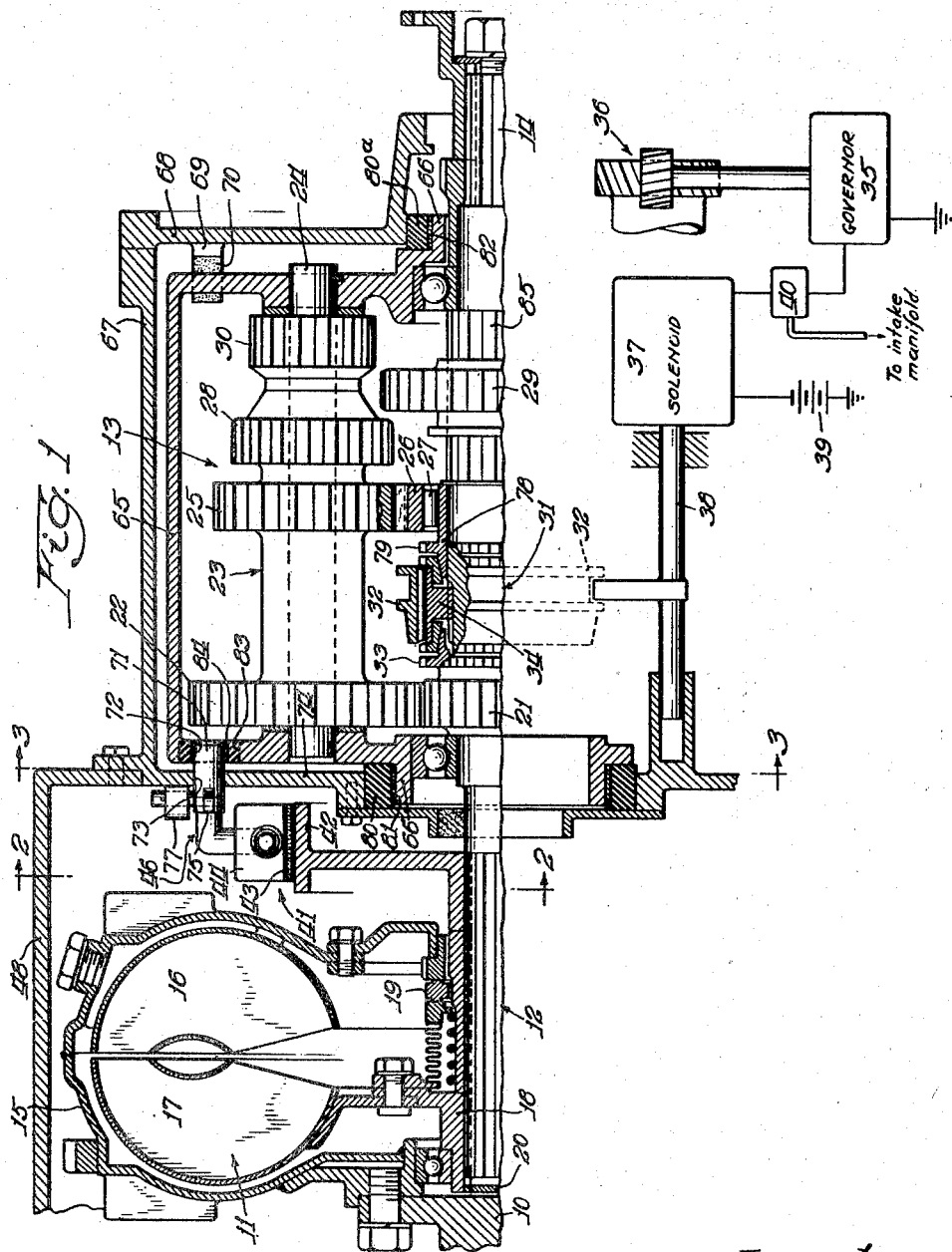

Patented Dec. 23, 1947

2,433,003

UNITED STATES PATENT OFFICE 2,433,003

SEMIAUTOMATIC TRANSMISSION

Benjamin A. Swennes, Rockford, Ill., assignor to Borg-Warner Corporation, Chicago, Ill., a corporation of Illinois Application November 15, 1940, Serial No. 365,737

15 Claims. (Cl. 192—4)

1

This invention relates to speed and torque changing mechanisms and particularly to such mechanism employing a fluid device combined with gearing.

It has been proposed to use fluid devices either of the kinetic or displacement types to augment or replace the conventional friction clutch and three speed gear transmission used in automobiles. These fluid devices, particularly the kinetic type, possess characteristics which make them highly desirable for such use. Such fluid couplings and torque converters, when used in place of the friction clutch of the conventional transmission, give a very smooth start, absorb vibration and shock, and permit a car to be rolled over obstacles which otherwise would require either a dangerous slipping of a clutch or a sudden application of power which imposes great shock loads upon the entire vehicle.

Fluid devices however, have off-setting undesirable characteristics which if corrected by any of the methods now known, add greatly to the complexity of the transmission and detract from the value of the devices as a whole. One such undesirable characteristic is that of imposing a constant drag upon the driven element of the drive which in turn imposes a constant load upon all of the associated elements such as gears and positive clutches and results ultimately in a tendency of the vehicle to creep. It has been proposed to remove this undesirable drag by forcibly stopping the driven element of the fluid drive. This of course does remove the drag insofar as the fluid device is concerned, but if the driven element is forcibly stopped while the vehicle is still in motion, the inertia of the vehicle would impose an equally great load upon the gears and clutches which would react against the stopping means and render gear shifting impossible.

The principal object of this invention is to provide a transmission of the fluid drive type in which the drag imposed by the fluid device is removed and in addition the load of the vehicle is relieved from the elements between the fluid device and the rear wheels.

Another object of this invention is to provide a satisfactory control device for a transmission employing the load relieving means of this invention.

A feature of this invention is a support for a transmission which is insulated from the chassis of the vehicle in which it is installed to avoid the transmission of gear noises thereto.

These and other objects and features of this invention will become apparent from the following description when taken together with the accompanying drawings in which:

Fig. 1 is a section through the transmission;
Fig. 2 is a section taken along lines 2—2 of Fig. 1; and
Fig. 3 is a section of the transmission taken along the lines 3—3 of Fig. 1.

Referring now to the drawings for a detailed description of the invention, the transmission is comprised of a drive shaft 10 to which is secured a fluid coupling 11 of the Fottinger type which, in turn, drives an intermediate shaft 12.

Said intermediate shaft 12 passes rearwardly to a countershaft type transmission 13 which changes the speed and torque ratio of the drive in intermediate shaft 12 and then transmits the changed drive to driven shaft 14.

Fluid coupling 11 is comprised of a flywheel housing 15 to which is secured a vaned driving rotor 16. Opposite rotor 16 is a driven rotor 17 of the vaned type which is secured to a flanged hub 18 splined to intermediate shaft 12. Appropriate seals 19 and 20 between flywheel housing 15 and hub 18 retain the driving fluid within housing 15.

Transmission 13 is comprised of a drive gear 21 formed on the end of intermediate shaft 12 which engages a first gear 22 of a gear cluster 23. Said gear cluster 23 is free to rotate about a countershaft 24. A second gear 25 on gear cluster 23 is constantly in mesh with a gear 26 which is rotatably mounted on driven shaft 14 by means of an over-running clutch 27. A third gear 28 on gear cluster 23 is adapted to engage a slidable gear 29 coupled by means of splines 85 to driven shaft 14, and a fourth gear 30 on gear cluster 23 is adapted to drive gear 29 through the intermediary of an idler (not shown) to establish a reverse drive.

Driven shaft 14 can be coupled directly to intermediate shaft 12 by means of a conventional synchronizer type jaw clutch 31 which has a slidable collar 32 provided with internal teeth adapted to engage external teeth 33 on gear 21 and thereby connect them with a hub member 34 on driven shaft 14. Overrunning clutch 27 is provided with a hub member 78 which has teeth 79 adapted to be engaged by collar 32 to connect hub member 78 with driven shaft 14.

For purposes of illustration, this invention will be described as applied to transmission 13 when the latter is equipped for semi-automatic operation. It will be noted that the gear combination is essentially that of an ordinary three speed and reverse countershaft type transmission wherein a sliding gear is used to establish low or reverse and a synchronizer is used to establish second speed and direct drive. Thus when sliding gear 29 is in the right hand position (Fig. 1) so as to engage the reverse idler, the transmission is conditioned for reverse. In neutral, sliding gear 29 is positioned mid-way between gears 30 and 28 so as to be free of cluster gears 23. For low speed forward, sliding gear 29 is engaged with gear 28 on cluster 23. Second speed is obtained by sliding gear 29 to its neutral position and moving collar 32 of synchronizer 31 to the right so as to connect hub member 78 of overrunning clutch 27 with driven shaft 14. This establishes a drive between gear 25 and gear 26 through overrunning clutch 27 and synchronizer 31 to driven shaft 14. For direct drive, collar 32 of synchronizer 31 is moved to the left so as to engage intermediate shaft 12 directly with driven shaft 14.

It will be apparent that if gear 29 is left in its neutral position and synchronizer 31 is properly operated the transmission may be used as a simple two-speed automatic transmission if desired. The controls for such a two-speed transmission are shown schematically and comprise an electrical governor 35 which is driven from driven shaft 14 by means of suitable gearing 36 so that the governor is responsive to the speed of the vehicle. Electrically associated with the governor 35 is a suitable solenoid 37 having an armature 38 which is adapted to engage collar 32 of synchronizer 31. Current for operating solenoid 37 may be obtained from a battery 39 or other suitable source of electrical energy. Solenoid 37 is so constructed that below a given speed of say twelve miles per hour, synchronizer collar 32 will be in the right hand position so as to establish and maintain second speed drive. Above twelve miles per hour armature 38 will be moved to the left to engage intermediate shaft 12 directly to establish direct drive. If desired, a vacuum controlled switch 40 may be inserted in the circuit between governor 35 and solenoid 37 to delay the operation of solenoid 37 if for any reason the torque load is heavy and low speed is desired. In this way the speed at which solenoid 37 will become operative may be made higher at the will of the operator. The shift to direct will become effective when the operator releases the accelerator and a high vacuum is created in the intake manifold of the engine.

Sliding gear 29 requires that cooperating sets of teeth be synchronized and meshed. The meshing cannot take place satisfactorily while relative rotation exists, or, if the teeth are already in mesh, if a load is imposed on the teeth. Fluid coupling 11 is continuously driven from drive shaft 10, and since the coupling transmits torque as a function of the speed of shaft 10, it will impose a slight, but nevertheless appreciable, torque, on intermediate shaft 12 and gear cluster 23 when the vehicle engine is idling, and this torque renders difficult the engagement of sliding gear 29 with gears 25 or 30. Accordingly, a brake 41 is provided for driven element 17 of fluid coupling 11. The brake comprises a drum 42 splined to intermediate shaft 12 so as to be rotatable therewith, and a brake band 43 which is shown more clearly in Fig. 2. Said brake band 43 is provided with lugs 44 and 45 by which the band is operated. Lug 44 constitutes the reaction lug and reacts against a bell crank 46 which in turn reacts against an abutment 47 in bell housing 48 which surrounds fluid coupling 11. The reaction against abutment 47 is taken through a spring 49 or other resilient means so that relative motion is permitted between bell crank 46 and the abutment up to a certain point and beyond that point spring 49 is no longer effective. For this reason bell crank 46 is provided with a pin 50 which serves to support one end of the spring 49, and abutment 47 is provided with a similar pin 51 which serves to support the opposite end of spring 49. Said pins 50 and 51 engage before spring 49 is fully compressed.

Lug 45 is connected by means of a rod 52 to an operating piston 53 in a cylinder 54. A conduit 55 connects cylinder 54 with cylinder 56 of the service brake pedal 57.

It is undesirable to have brake 41 applied every time service brake 57 is operated since on many occasions a driver may wish merely to slow down and not come to a stop and he would then be using brake 41 to stop the vehicle in addition to or instead of the regular service brakes. It is preferred to operate brake 41 only when making a shift in the transmission and since these shifts, particularly the shift between forward and reverse, are made when the car is standing still it is preferred to operate brake 41 only when the vehicle is not in motion or is coming to a stop. For this reason a valve 58 is interposed in the conduit 55 leading from brake cylinder 56 to cut off cylinder 54 from the brake system at all times except when it is necessary to operate brake 41. The control for valve 58 may comprise a solenoid 59 the circuit to which is controlled in turn by shift lever 60 at the steering wheel 61. Lever 60 is pivoted at 62 and is provided at its inner end with a pair of contacts 63 and 63a which are in the circuit to the solenoid 59. Shift lever 60 may be of standard type employed with three-speed transmissions and as such has two planes of movement, one above the other. The upper plane is used for reverse and low speed and the lower one is used for second and direct. In the present transmission the shift from second to direct and back to second is made automatically and the second speed position may be omitted. When in neutral, lever 60 rests in the lower plane. Contacts 63 and 63a are so arranged that when lever 60 is in neutral position in the lower plane, the circuit through solenoid 59 is broken, but when lever 60 is raised to its upper plane preparatory to shifting either to low or reverse, the circuit will be completed to operate solenoid 59 and open valve 58 to permit pressure to be transmitted to cylinder 54 from brake cylinder 56. Before completing the shift to either of the ratios permitted, the circuit will be broken and valve 58 will be restored to its closed position to prevent the transmission of fluid pressure to cylinder 54. A ball check valve 64 permits any fluid under pressure trapped in cylinder 54 to escape around valve 58 if the valve should be in its closed position and brake pressure is relieved, otherwise the car would be unable to move, despite the release of the service brakes.

It will be apparent that with brake 41 applied and transmission 13 in low gear, that is, with gear 29 engaging gear 28, it would be possible to halt the car in such a fashion as to impose a load on driven shaft 14 which in turn would impose a load on the gear train up to and including brake 41. With brake 41 applied however, this load remains on the gear teeth and makes it substantially impossible to shift gear 29. Such a condition would exist for example when brake 41 is applied and the car is on a short incline or is resiliently held against a wall by its bumper. To obviate this difficulty the novel mechanism hereinafter described is employed.

Countershaft 24 is mounted in a frame 65 which is free to rotate about shaft 14. Suitable bearings 66 are provided for this purpose. Surrounding frame 65 is a casing 67 which is closed off at the rear by plate 68. Said plate 68 is provided with a pair of abutments 69 which are in the path of travel of frame 65. Abutments 69 are so spaced as to permit a limited amount of oscillation of frame 65 about shaft 14. To avoid excessive noise the inner surfaces of abutments 69 are provided with blocks of rubber 70 vulcanized to the abutments.

Under ordinary conditions, frame 65 is held against oscillation in either direction by means of a pin 71 which extends into an aperture 72 in frame 65. Said pin 71 passes through an opening 73 in the forward closure plate 74 of housing 67. Its forward end is pivotally connected by means of a lost motion connection 75 to an arm 76 of bell crank 46. Bell crank 46 is in turn pivoted in a lug 77 on closure member 74.

Thus when brake 41 is operated, the pressure in cylinder 54 is transmitted to reaction lug 44 on brake band 43 and thence to bell crank 46 which is then rotated about its pivot 77. This rotating movement is transmitted through arm 76 and pivotal connection 75 to pin 71 to withdraw said pin from aperture 72, thereby freeing frame 65. If at the time brake 41 is operated a load exists on shaft 14, this torque load will be transmitted through gear 29 to gear 28. It will be noted at this point that gear 28 and its associated gear 22 form in effect a pair of planet gears which are rotatable freely, within the limits provided by abutments 69, about shafts 14 and 12. Due to the difference in diameters between gears 21 and 29 the torque load on gear 29 will result in a planetary movement of cluster gear 23 and its associated frame 65 about intermediate shaft 12 and driven shaft 14. This rotation will continue until either an abutment is struck or the torque load is relieved. If frame 65 strikes an abutment 69 before the torque load is relieved, the operator merely releases the brake by releasing service brake pedal 57 which thereby interposes an opposing torque due to the drag existing in fluid coupling 11. This opposing torque may be made to balance the remaining load in the gears, and when such a balance is established, gear 29 may then be moved freely out of engagement with gear 28. Should the vehicle be so situated that the smallest movement thereof would be inexpedient or hazardous, the emergency brake may be substituted for the service brake while the latter is released.

Substantially the same conditions obtain with respect to the reverse gear connection, and the torque relieving means described above is equally as effective for getting out of reverse as it is for getting out of low.

The foregoing construction causes all radial thrusts between the gears to be taken by frame 65 and the loads between frame 65 and case 67 are therefore principally those imposed by the dead weight of the transmission. This renders possible the use of resilient mountings 80 and 80a between frame 65 and casing 67 which will materially reduce the amount of vibrations transmitted to the casing and chassis of the vehicle. Said mountings 80a and 80 are in the form of rings of rubber to which are vulcanized metal bushings 81 and 82 respectively. Similarly, frame 65 is provided with a rubber insert 83 to which is vulcanized a metal liner 84. With the engine resiliently mounted, and the rear axle assembly likewise separated from the chassis by springs, the insulation of frame 65 renders complete the insulation of the power transmission system from the chassis and results in a quieter operation of the vehicle.

Another feature resulting from the construction used resides in the fact that the absence of torque loads and radial thrusts from casing 67 makes it possible to use a much lighter construction everywhere except in closure plate 74 which takes the reaction of brake 41. Thus the greater portion of casing 67 can be made of very light castings or from a heavier gauge sheet metal.

This invention is applicable generally to any transmission having a positive coupling of some kind in the torque transmitting circuit. In the transmission described, the coupling is comprised of splines 85 which transmit the drive from gear 29 to shaft 14. In other transmissions it may be a jaw clutch similar to that connecting intermediate shaft 12 and driven shaft 14. When applied to a transmission of the type described a very inexpensive two-speed automatic transmission results which is satisfactory for the greater portion of the driving conditions usually encountered. The governor automatically shifts synchronizer 31 to whatever ratio is called for by the speed of the vehicle, the overrunning clutch rendering the shifting to and from second speed easy, and the slip characteristic of the fluid coupling relieving the direct drive clutch of torque to permit the shift out of direct at low speeds. The shift into direct is, of course, effected upon the torque reversal resulting from the release of the accelerator pedal and is therefore readily achieved. For difficult conditions in which the two automatic speeds are not adequate, the manually operated low speed is available, the means described above rendering the operation of the low speed controls easy.

It is understood that the foregoing description is merely illustrative of a preferred embodiment of the invention and that the scope of the invention therefore is not to be limited thereto but is to be determined by the appended claims.

I claim:

1. A transmission comprising a drive shaft, a driven shaft, change speed gearing connected between the shafts, said gearing including a positive coupling, and a countershaft, means for arresting the rotation of one of the shafts, a supporting means for the countershaft adapted to move the countershaft a limited distance, and means normally fixing the countershaft, said fixing means being releasable in timed relation to the arresting of the said one of the shafts, whereby to relieve the positive coupling of load.

2. A transmission comprising a drive shaft, a hydraulic coupling device connected to the drive shaft, said coupling having driven and driving rotors, a driven shaft, change speed gearing connected between the driven rotor and the driven shaft, said gearing including a positive coupling and a countershaft, means for arresting the driven rotor while the driving rotor is rotating, a supporting means for the countershaft adapted to move the countershaft through a limited distance, and means normally fixing the countershaft, said fixing means being releasable in timed relation to the arresting of the driven rotor, whereby to relieve the positive coupling of load.

3. A transmission comprising a drive shaft, a driven shaft, change speed gearing between said shafts, said gearing including a sliding gear, a countershaft, a support for the countershaft rotatably mounted with respect to the driving and driven shafts, means for fixing the countershaft against rotation, a brake for the drive shaft, means connecting the brake with the fixing means and adapted to release the countershaft when the brake is applied, stops limiting the rotational movement of the countershaft, and manual means for operating the brake, said countershaft when released being capable of rotating in the direction of relieving any torque that might exist on the sliding gear as a result of the application of the brake.

4. A transmission for an automotive vehicle comprising a drive shaft, a driven shaft, change speed gearing between said shafts, said gearing including a positive coupling means, a countershaft, a support for the countershaft rotatably mounted with respect to the driving and driven shafts, means for fixing the countershaft against rotation, a brake for the drive shaft, means connecting the brake with the fixing means and adapted to release the countershaft when the brake is applied, stops limiting the rotational movement of the countershaft, a service brake for the vehicle, and connections between the service brake and the drive shaft brake whereby to operate the latter from the former, said countershaft being capable of rotating in the direction of relieving any torque that might exist in the positive coupling as a result of the operation of the driving shaft brake.

5. A transmission as described in claim 4, a control for the positive coupling, and means for preventing the operation of the driving shaft brake except when the control for the positive coupling is operated.

6. A transmission for an automotive vehicle comprising a drive shaft, a driven shaft, a hydraulic coupling having a drive rotor connected to the drive shaft and a driven rotor, a change speed mechanism connected to the driven rotor and to the driven shaft, a brake for the driven rotor, means for operating the rotor brake, automatic means for controlling a portion of the change speed mechanism, manual means for controlling another portion of the change speed mechanism, said manual controlling means also controlling the rotor brake, a countershaft in the change speed mechanism adapted for limited rotational movement about the axes of the drive and driven shafts to relieve the manually operated portion of the mechanism of load torque, and means for holding the countershaft against such rotational movement, said means being controlled by the rotor brake.

7. A transmission for an automotive vehicle as described in claim 6, a service brake for the vehicle, and a connection between the service brake and rotor brake whereby to operate the latter from the former.

8. In a transmission, the combination of a drive shaft, a driven shaft, the axes of said shafts lying on a common line, means for completing a power train between said shafts and including elements adapted to positively interengage, means for arresting one of said shafts, and means effective for permitting rotation of one of said interengageable elements in either direction in an orbit about an axis substantially coinciding with the axes of said shafts when said arresting means is operative whereby said elements may be easily engaged or disengaged.

9. A power transmission system comprising a source of power, a load, a speed changing mechanism including elements adapted to positively interengage for completing a power train through the mechanism, a connection between said speed changing mechanism and said source of power, a connection between said speed changing mechanism and said load, the axes of rotation of said two connections lying on a common line, means for arresting one of the said connections, and means effective for permitting rotation of one of said interengageable elements in either direction in an orbit about an axis substantially coinciding with the axes of rotation of said connections when said arresting means is operative whereby said elements may be freely engaged or disengaged.

10. A transmission comprising a hydrodynamic torque transmitting device, a drive shaft connected with said device to be driven thereby, said hydrodynamic device constantly applying torque to said drive shaft, a driven shaft, gearing connected between said shafts and including elements adapted to be positively interengaged for completing a gear train between the shafts, said gearing including a reaction element normally held fixed for establishing said gear train, means for arresting said drive shaft, and means for releasing said reaction element when said arresting means is operative whereby to relieve said elements when interengaged from torque to facilitate their disengagement.

11. A transmission comprising a drive shaft, a driven shaft, means for arresting the rotation of one of the shafts, change speed gearing connected between said shafts, said gearing including positive interengaging elements and a countershaft, a movable support for the countershaft, and means fixing said countershaft support for completing a power train through said gearing, said fixing means being releasable for relieving the positive interengaging elements of load.

12. A transmission comprising a drive shaft, a driven shaft, means for arresting the rotation of one of the shafts, change speed gearing connected between said shafts, said gearing including positive interengaging elements and a countershaft, a movable supporting means for the countershaft, and means normally fixing the countershaft supporting means for completing a power train through said gearing, said fixing means being releasable in timed relation to the arresting of the said one of the shafts, whereby to relieve the positive interengaging elements of load.

13. A transmission comprising a hydrodynamic torque transmitting device, a drive shaft connected to be driven by said device, said hydrodynamic device constantly applying torque to said drive shaft, a driven shaft, the axes of rotation of said drive and driven shafts lying on a common line, a speed change mechanism connected between said shafts, said mechanism including elements adapted to interengage positively for completing a power train through the mechanism, means for arresting said drive shaft, and means effective for permitting rotation of one of said interengageable elements in either direction in an orbit about an axis substantially coinciding with the axes of said shafts when said arresting means is operative whereby said elements may be freely engaged or disengaged.

14. A power transmission system comprising a source of power, a load, a hydrodynamic torque transmitting device connected to be driven by said source of power, a drive shaft connected to be driven by said device, said hydrodynamic device constantly supplying torque to said drive shaft, a driven shaft connected to drive said load, the axes of rotation of said drive and driven shafts lying on a common line, gearing connected between said shafts, coupling means associated with said gearing, said gearing including elements adapted to interengage positively for completing a power train between said shafts when said coupling means is engaged, a brake for said drive shaft, said coupling means when disengaged allowing rotation of one of said interengageable elements in either direction in an orbit about an axis substantially coinciding with the axes of said shafts when said brake is engaged, and means for making said brake effective and for thereafter disengaging said coupling means while said brake is operative whereby said elements may be freely engaged or disengaged.

15. A transmission comprising a hydrodynamic torque transmitting device, a drive shaft connected with said device to be driven thereby, said hydrodynamic device constantly applying torque to said drive shaft, a driven shaft, gearing connected between said shafts and including elements adapted to be positively interengaged for completing a gear train between the shafts, said gearing including a reaction element normally held fixed for establishing said gear train, means for arresting said drive shaft, and means operated by said arresting means for releasing said reaction element when said arresting means is rendered operative whereby to relieve said elements when interengaged from torque to facilitate their disengagement.

BENJAMIN A. SWENNES.

REFERENCES CITED

The following references are of record in the file of this patent:

UNITED STATES PATENTS

| Number | Name | Date |
| --- | --- | --- |
| 2,230,050 | Nutt | Jan. 28, 1941 |
| 2,237,433 | Hofmann, Jr. | Apr. 8, 1941 |
| 2,237,958 | Hansen et al. | Apr. 8, 1941 |
| 1,978,172 | Sinclair | Oct. 23, 1934 |
| 2,104,605 | Boldt | Jan. 4, 1938 |
| 2,258,475 | Sinclair | Oct. 7, 1941 |
| 2,247,714 | Peterson et al. | July 1, 1941 |
| 2,203,177 | Patterson | June 4, 1940 |
| 1,969,561 | Keller | Aug. 7, 1934 |
| 2,084,219 | Salerni | June 15, 1937 |
| 1,541,240 | Barkeij | June 9, 1925 |
| 2,108,986 | Klimek | Feb. 22, 1938 |
| 2,256,960 | Neracher et al. | Sept. 23, 1941 |
| 2,082,581 | Niep | June 1, 1937 |
| 2,019,745 | Swennes | Nov. 5, 1935 |
| 1,689,245 | Klimek | Oct. 30, 1928 |